(12) United States Patent
Okamura

(10) Patent No.: US 9,936,252 B2
(45) Date of Patent: Apr. 3, 2018

(54) IMAGE SIGNAL RECEIVING APPARATUS, METHOD FOR SETTING RECEIVING CHANNEL THEREOF, AND DISPLAY APPARATUS

(71) Applicant: BOE TECHNOLOGY GROUP CO., LTD., Beijing (CN)

(72) Inventor: Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/436,285

(22) PCT Filed: Jul. 29, 2014

(86) PCT No.: PCT/CN2014/083203
§ 371 (c)(1),
(2) Date: Apr. 16, 2015

(87) PCT Pub. No.: WO2015/109806
PCT Pub. Date: Jul. 30, 2015

(65) Prior Publication Data
US 2016/0044377 A1     Feb. 11, 2016

(30) Foreign Application Priority Data
Jan. 27, 2014   (CN) .......................... 2014 1 0040197

(51) Int. Cl.
*H04N 7/16*     (2011.01)
*G06F 3/00*     (2006.01)
(Continued)

(52) U.S. Cl.
CPC ... *H04N 21/4524* (2013.01); *H04N 21/25841* (2013.01); *H04N 21/4383* (2013.01)

(58) Field of Classification Search
CPC ......... H04N 21/25841; H04N 21/4383; H04N 21/4524
(Continued)

(56) References Cited

U.S. PATENT DOCUMENTS 8,516,514 B2 * 8/2013 Belz .................. G08B 21/0423
340/539.25
2006/0025092 A1   2/2006 Sanders et al.
(Continued)

FOREIGN PATENT DOCUMENTS

| CN | 1838748 A | 9/2006 |
| CN | 1901645 A | 1/2007 |

(Continued)

OTHER PUBLICATIONS

International Search Report Appln. No. PCT/CN2014/083203; dated Oct. 27, 2014.
(Continued)

*Primary Examiner* — Nasser Goodarzi
*Assistant Examiner* — Jaycee Imperial
(74) *Attorney, Agent, or Firm* — Ladas & Parry LLP

(57) ABSTRACT

There are provided an image signal receiving apparatus, a method for setting a receiving channel of the image signal receiving apparatus, and a display apparatus. The method for setting the receiving channel comprises: storing (101) map information in the image signal receiving apparatus, wherein the map information comprises correspondence relationship between a transmitting channel and the receiving channel at each of different geographical positions; automatically determining (102) a geographical position where the image signal receiving apparatus is located; inquiring (103) the correspondence relationship between the transmitting channel and the receiving channel according to the geographical position where the image signal receiving apparatus is located; and setting (104) the receiving channel of the image signal receiving apparatus according to result of the inquiry.

(Continued)

In the image signal receiving apparatus and the method for setting the receiving channel of the image signal receiving apparatus, a geographical position, where the image signal receiving apparatus is located, is determined automatically by a positioning module without inputting the geographical position where the image signal receiving apparatus is located manually, such that setting of the receiving channel of the image signal receiving apparatus after it moves in geographical position becomes more convenient, the troublesome manual setting is removed, and efficiency of the setting for the receiving channel is also improved.

14 Claims, 3 Drawing Sheets

(51) Int. Cl.
    *G06F 13/00*     (2006.01)
    *H04N 5/445*     (2011.01)
    *H04N 21/45*     (2011.01)
    *H04N 21/438*     (2011.01)
    *H04N 21/258*     (2011.01)

(58) Field of Classification Search
    USPC .............................................................. 725/9
    See application file for complete search history.

(56) References Cited

U.S. PATENT DOCUMENTS

2009/0098880 A1* 4/2009 Lindquist ................ G01S 19/34
                                                       455/456.1
2010/0146546 A1* 6/2010 Nishimura ............. G01C 21/20
                                                       725/39
2010/0302456 A1* 12/2010 Testin .................... G06F 1/3203
                                                      348/706
2011/0105094 A1 5/2011 Hassan et al.
2013/0281062 A1* 10/2013 Croy ...................... G06Q 30/02
                                                      455/411
2013/0312040 A1* 11/2013 Kim ..................... H04N 21/472
                                                      725/60
2014/0354890 A1* 12/2014 Eyer ....................... H04N 5/50
                                                      348/732

FOREIGN PATENT DOCUMENTS

| CN | 101634698 A | 1/2010 |
|---|---|---|
| CN | 101668191 A | 3/2010 |
| CN | 101277404 A | 8/2010 |
| CN | 102598719 A | 7/2012 |
| CN | 103796050 A | 5/2014 |

OTHER PUBLICATIONS

Written Opinion of the International Searching Authority Appln. No. PCT/CN2014/083203; dated Oct. 27, 2014.

Second Chinese Office Action dated Sep. 27, 2016; Appln. No. 201410040197.1.

First Chinese Office Action dated Jul. 19, 2016; Appln. No. 201410040197.1.

* cited by examiner

IMAGE SIGNAL RECEIVING APPARATUS, METHOD FOR SETTING RECEIVING CHANNEL THEREOF, AND DISPLAY APPARATUS

TECHNICAL FIELD OF THE DISCLOSURE

The present disclosure relates to a field of display technology, and particularly to an image signal receiving apparatus, a method for setting receiving channels thereof, and a display apparatus.

BACKGROUND

With rapid development of television industry, terrestrial wave digital mobile televisions, which transmit digital signals in terrestrial waves, have become a tendency of development. Generally, central control stations in different regions transmit broadcasting television signal to a regional transmitting station, the regional transmitting station amplifies the signal and then transmits the amplified signal, and then the digital television receiver receives the transmitted signal in the region. The transmitting station commonly transmits the digital signals by using terrestrial waves in a UHF frequency band (that is, radio waves with ultrahigh frequencies in a frequency range 300-3000 MHz).

Generally, when a digital mobile television moves to a different region, it is necessary to input the information on the regional position (such as a zip code, address and etc.) of the region into a digital television receiver at first before the digital television receiver can receive terrestrial wave digital signal in the region. The digital television receiver cannot receive the terrestrial wave digital signal transmitted by the transmitting station of the region if the information on region of the region is not input beforehand. After the information on the regional position is inputted, it is further necessary to set a receiving channel of the digital television receiver, that is, to set the receiving channel of the receiver to correspond to a transmitting channel of the transmitting station. Only when the setting is successfully completed, can the receiving channel receive the transmitted signal normally, and thus the digital mobile television can play the programs of the region normally.

At present, in the application of the terrestrial wave digital mobile television, every time the digital mobile television moves to a new region, it is necessary to input the information on region of the area into the digital television receiver manually and to set the receiving channel of the receiver to correspond to a transmitting channel in the region before the terrestrial wave digital signal of the region can be normally received. Manual inputting and setting operations are troublesome, so that the use of the digital television receiver is also inconvenient.

SUMMARY

In embodiments of the present disclosure, there are provided an image signal receiving apparatus, a method for setting a receiving channel of the image signal receiving apparatus, and a display apparatus. In the image signal receiving apparatus and the method for setting the receiving channel of the image signal receiving apparatus, a geographical position where the image signal receiving apparatus is located is determined automatically by a positioning module, such that setting of the receiving channel of the image signal receiving apparatus becomes more convenient after its geographical position is shifted, and the troublesome manual setting can be eliminated.

In accordance with one aspect of the present disclosure, there is provided a method for setting a receiving channel of an image signal receiving apparatus comprising: storing map information in the image signal receiving apparatus, wherein the map information comprises correspondence relationship between a transmitting channel and the receiving channel at each of different geographical positions; automatically determining a geographical position where the image signal receiving apparatus is located; inquiring the correspondence relationship between the transmitting channel and the receiving channel according to the geographical position where the image signal receiving apparatus is located; and setting the receiving channel of the image signal receiving apparatus according to result of the inquiry.

Optionally, the geographical position where the image signal receiving apparatus is located is determined automatically by a GPS positing module.

Optionally, the method for setting the receiving channel further comprises: before determining the geographical position where the image signal receiving apparatus is located automatically, determining whether the image signal receiving apparatus moves in geographical position; and activating the GPS positioning module if the image signal receiving apparatus moves in geographical position, and otherwise maintaining the GPS positioning module to be deactivated.

Optionally, whether the image signal receiving apparatus moves in geographical position is determined according to a count value of a power supply switching counter; it is determined that the image signal receiving apparatus moves in geographical position if the count value is 1, and it is determined the image signal receiving apparatus does not move in geographical position if the count value is an integer equal to or bigger than 2.

Optionally, the count value of the power supply switching counter is reset after the power supply switching counter does not count for a period of time which is equal to or longer than 24 hours.

Optionally, said setting the receiving channel of the image signal receiving apparatus according to result of the inquiry comprises: setting the transmitting channel and the receiving channel of the image signal receiving apparatus in one-to-one correspondence at first before the receiving channel of the image signal receiving apparatus is set; prompting the user with setting confirmation signals after the transmitting channel and the receiving channel of the image signal receiving apparatus are set in one-to-one correspondence; setting the receiving channel of the image signal receiving apparatus and deactivating the GPS positing module if a reply to the setting confirmation signal is positive; otherwise, deactivating the GPS positing module and initiating a manual setting for the receiving channel of the image signal receiving apparatus.

In accordance with another aspect of the present disclosure, there is further provided an image signal receiving apparatus comprising a storage module, a positioning module, an inquiring module and a setting module; wherein the storage module is configured to store map information which comprises correspondence relationship between a transmitting channel and a receiving channel at each of different geographical positions;

the positioning module is configured to determine a geographical position where the image signal receiving apparatus is located automatically and send information on the geographical position to the inquiring module;

the inquiring module is configured to inquire the correspondence relationship between the transmitting channel and the receiving channel in the storage module according to the information on the geographical position and send result of the inquiry to the setting module; and the setting module is configured to set the receiving channel of the image signal receiving apparatus according to the result of the inquiry.

Optionally, the positioning module comprises a GPS positioning module, and the image signal receiving apparatus further comprises a determination module which is configured to determine whether the image signal receiving apparatus moves in geographical position and send a result of determination to the GPS positioning module.

Optionally, the determination module comprises a power supply switching counter which is configured to determine whether the image signal receiving apparatus moves in geographical position according to its count value.

Optionally, the determination module further comprises a reset sub-module which is configured to reset the count value of the power supply switching counter after the power supply switching counter does not count for a period of time which is equal to or longer than 24 hours.

Optionally, the setting module further comprises a setting confirmation sub-module which is configured to prompt the user with setting confirmation signals after the transmitting channel and the receiving channel of the image signal receiving apparatus are set in one-to-one correspondence; and send a feedback signal to the setting module according to the reply to the setting confirmation signal. The setting module sets the receiving channel of the image signal receiving apparatus according to the feedback signal. The GPS positioning module is further configured to receive the setting confirmation signals and to be deactivated.

Optionally, the image signal receiving apparatus further comprises a manual setting module which is configured to receive a reply to the setting confirmation signal, and to decide whether initiate manual setting for the receiving channel of the image signal receiving apparatus according to the reply to the setting confirmation signal.

In accordance with another aspect of the present disclosure, there is further provided a display apparatus comprising the image signal receiving apparatus described above.

In the image signal receiving apparatus and the method for setting the receiving channel of the image signal receiving apparatus provided in the embodiments of the present disclosure, a geographical position, where the image signal receiving apparatus is located, is determined automatically by a positioning module without inputting the geographical position where the image signal receiving apparatus is located manually, such that setting of the receiving channel of the image signal receiving apparatus after it moves in geographical position becomes more convenient, and the troublesome manual setting can be removed, and efficiency of the setting for the receiving channel is also improved. In the display apparatus provided in the embodiment of the present disclosure, by adopting the above-described image signal receiving apparatus, it is more convenient for the display apparatus to receive display program at the geographical position where the display apparatus is located.

REFERENCE SIGNS

1. Storage module; 2. GPS positioning module; 3. Inquiring module; 4. Setting module; 41. Setting confirmation sub-module; 5. Determination module; 51. Power supply switching counter; 52. Reset sub-module; 6. Manual setting module

DETAILED DESCRIPTION

In order that those skilled in the art can understand the technical solutions in the embodiments of the present disclosure better, hereinafter, an image signal receiving apparatus, a method for setting a receiving channel of the image signal receiving apparatus, and a display apparatus provided in the embodiments of the present disclosure will be described in detail with reference to the accompanying drawings and the particular implementations.

First Embodiment

Figure 1:
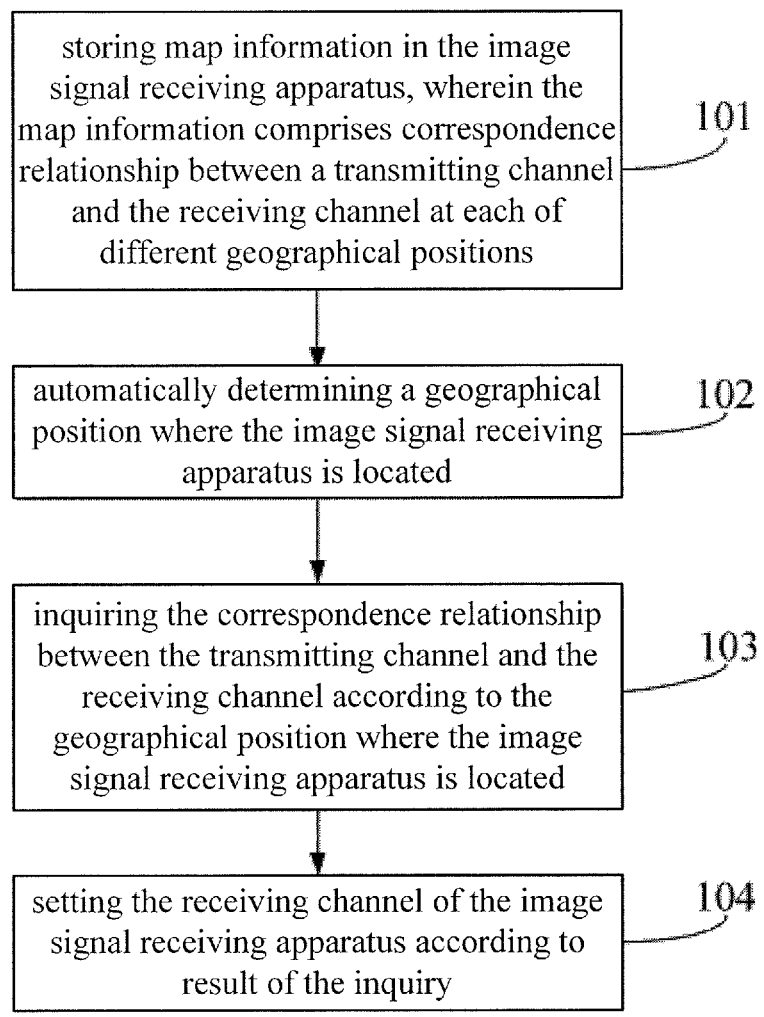
FIG. 1 is a flowchart of a method for setting a receiving channel of an image signal receiving apparatus according to a first embodiment of the present disclosure.

In the present embodiment, there is provided a method for setting a receiving channel of an image signal receiving apparatus. As shown in FIG. 1, the method comprises following steps.

At step 101, map information is stored in the image signal receiving apparatus. The map information comprises correspondence relationship between a transmitting channel and a receiving channel at each of different geographical positions.

In this step, the transmitting channel is configured to transmit terrestrial radio waves in a UHF frequency band (that is, ultrahigh frequency in a frequency range 300-3000 MHz), the radio waves for transmitting digital signals.

At step 102, a geographical position where the image signal receiving apparatus is located is determined automatically.

In this step, the geographical position where the image signal receiving apparatus is located is determined automatically by a GPS positing module. The automatic determination may particularly comprise the following operations.

The GPS positioning module inquires the geographical position where the image signal receiving apparatus is located, and compares information on the geographical position thus obtained with the map information, and ultimately determines the geographical position information which is determined to be consistent with the map information as the geographical position where the image signal receiving apparatus is located. Such process is automatically performed by the GPS positioning module completely without any human intervention such as inputting the geographical position where the image signal receiving apparatus is located manually; therefore, after the image signal receiving apparatus changes its geographical position, the setting of the receiving channel thereof becomes more convenient and the troublesome manual setting can be removed.

Here, the ultimately determined geographical position information comprises information on the geographical position, such as a zip code, address and etc.

At step 103, the correspondence relationship between the transmitting channel and the receiving channel is inquired according to the geographical position where the image signal receiving apparatus is located.

In this step, the correspondence relationship between the transmitting channel and the receiving channel in the geographical position, where the image signal receiving apparatus is located, is inquired in the map information. Since the correspondence relationship between the transmitting channel of the terrestrial waves and the receiving channel of the image signal receiving apparatus is different respective different geographical positions, the correspondence relationship between the transmitting channel and the receiving channel can be determined only when the geographical position is determined at first.

At step 104, the receiving channel of the image signal receiving apparatus is set according to result of the inquiry.

In this step, setting the receiving channel of the image signal receiving apparatus refers to setting the receiving channel of the image signal receiving apparatus to correspond to the transmitting channel at the geographical position where the image signal receiving apparatus is located. It should be explained that there are various manners for setting the transmitting channel to correspond to the receiving channel, for example, one-to-one correspondence, one-to-many correspondence, and many-to-many correspondence. In the present embodiment, the transmitting channel and the receiving channel at the geographical position where the image signal receiving apparatus is located are set in one-to-one correspondence since the transmitting channel of the local terrestrial waves and the receiving channel of the image signal receiving apparatus are set in one-to-one correspondence at each of the different geographical positions, thus ensuring normal reception operation of each receiving channel.

After the receiving channel is set, the image signal receiving apparatus can normally receive the digital signals in the terrestrial waves transmitted through the transmitting channel at the geographical position where the image signal receiving apparatus is located.

Second Embodiment

Figure 2:
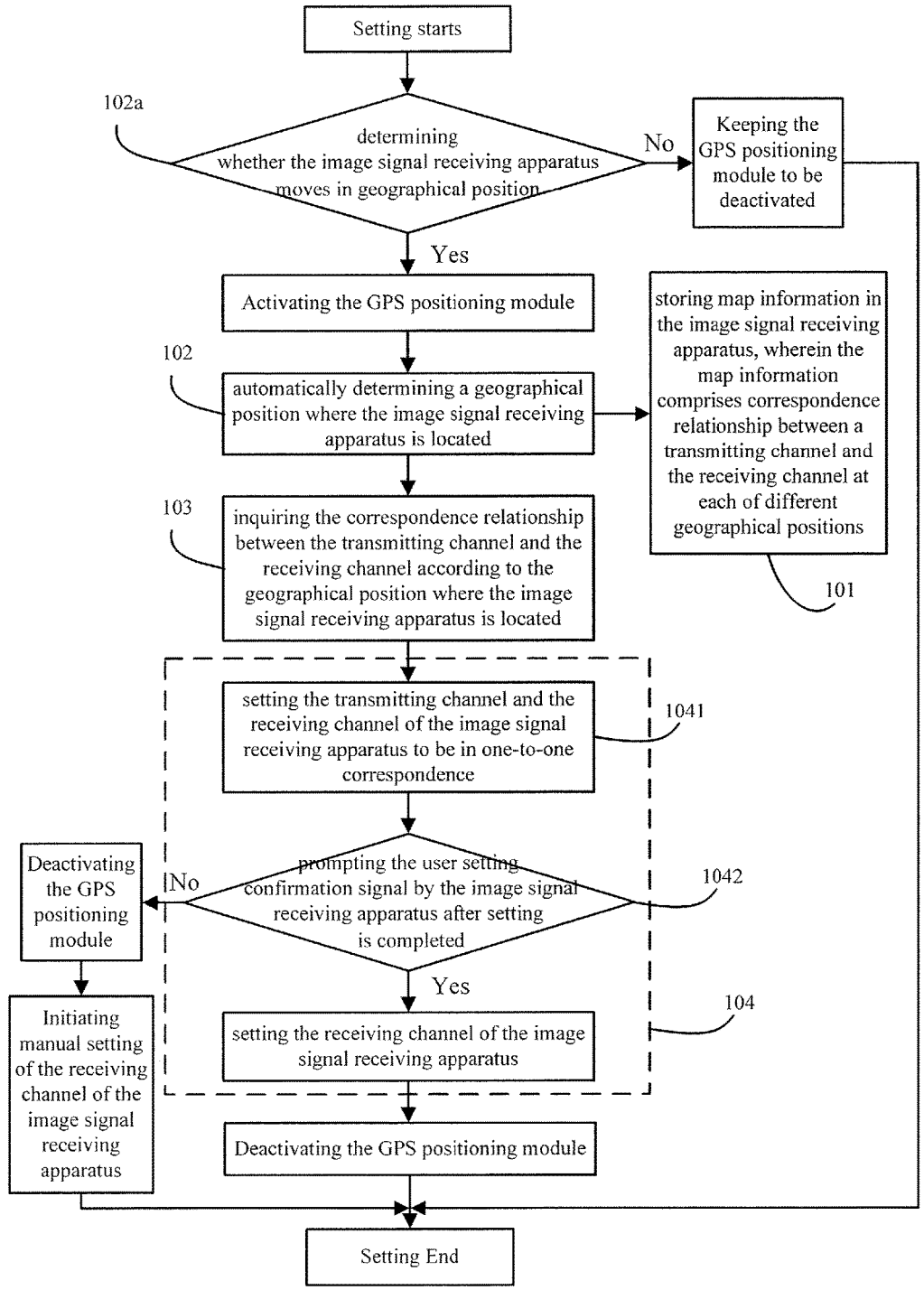
FIG. 2 is a flowchart of a method for setting a receiving channel of an image signal receiving apparatus according to a second embodiment of the present disclosure.

In the present embodiment, there is provided a method for setting a receiving channel of an image signal receiving apparatus. As shown in FIG. 2, different from the first embodiment, the method for setting a receiving channel of an image signal receiving apparatus according to the second embodiment further comprises the following operations before the geographical position where the image signal receiving apparatus is located is determined automatically at the step 102. At step 102a, it is determined whether the image signal receiving apparatus moves in geographical position. If it is true, the GPS positioning module is activated, and otherwise the GPS positioning module is kept to be deactivated.

Arrangement of the step 102a makes there is unnecessary for the GPS positioning module to be maintained in an operational state all the time, that is, the GPS positioning module operates only after the image signal receiving apparatus moves in geographical position, so as to determine a new geographical position where the image signal receiving apparatus is currently located. Therefore, efficiency of the method for setting the receiving channel can be improved and power consumption can be saved.

In the present embodiment, whether the image signal receiving apparatus moves in geographical position can be determined according to a count value of a power supply switching counter. If the count value is 1, it is determined that the image signal receiving apparatus moves in geographical position; if the count value is an integer equal to or larger than 2, it is determined that the image signal receiving apparatus does not move in geographical position.

In the present embodiment, the count value of the power supply switching counter is reset (that is, the count value is returned to 0) after the power supply switching counter does not count for a period of time which is equal to or longer than 24 hours.

Here, the operational principle of the power supply switching counter is as follows: the power supply switching counter accumulates one to its count value every time when a power supply plug of the image signal receiving apparatus is plugged in/out; and a time interval between two adjacent plug-in/plug-out of the power supply plug is shorter than 24 hours. If the power supply switching counter keeps its count value for 24 hours or longer than 24 hours after a counting operation, it will return its accumulated count value to 0 (that is, reset the accumulated count value) before a next counting operation, and the next counting operation will start from 0. That is, the power supply switching counter determines whether the image signal receiving apparatus moves in the geographical position by determining a time length in which the power supply switching counter is kept in a un-counting state.

It should be explained that the time length in which the power supply switching counter is kept in a un-counting state can be set manually, that is, the time length in which the power supply switching counter is kept in a un-counting state can be any time length, and can be set according to user requirement.

In the present embodiment, the step 104 in which the receiving channel of the image signal receiving apparatus is set according to result of the inquiry can comprise the following sub-steps. At sub-step 1041, the transmitting channel and the receiving channel of the image signal receiving apparatus are set in one-to-one correspondence at first before the receiving channel of the image signal receiving apparatus is set. At sub-step 1042, after the transmitting channel and the receiving channel of the image signal receiving apparatus are set in one-to-one correspondence, the image signal receiving apparatus prompts the user for a setting confirmation signal.

At the sub-step 1042, if a reply to the setting confirmation signal is positive, the receiving channel of the image signal receiving apparatus is set and the GPS positing module is deactivated; if the reply to the setting confirmation signal is negative, the GPS positing module is deactivated and a manual setting of the receiving channel of the image signal receiving apparatus is initiated.

Here, the setting confirmation signals are a prompt signal outputted from the image signal receiving apparatus to a user for prompting the user to make a final confirmation on the result of automatic setting for the receiving channel. The user can give out a "positive" or "negative" reply according to whether a display device of the image signal receiving apparatus has been able to normally play a display program received in the receiving channel. That is, if the display device has been able to normally play the display program received in the receiving channel, it shows that the automatic setting for the receiving channel is correct; in such a case, if the user gives a "positive" reply, the automatic setting will be adopted or acknowledged, and then the setting process of the receiving channel is completed; if the display device cannot normally play a display program received in the receiving channel, it shows that the automatic setting for the receiving channel is in error (for example, inaccurate positioning due to the malfunction of the GPS positioning module), at this time, the user is required to give a "negative" reply, and in such a case, the automatic setting for the receiving channel will be cancelled completely, and meanwhile a manual setting for the receiving channel of the image signal receiving apparatus is initiated.

It should be noted that the user can input the "positive" or "negative" reply to the image signal receiving apparatus via a remote controller to make a reply to the "setting confirmation signal".

Arrangement of the sub-step 1042 enables the user to know in time and then control the automatic setting for the receiving channel effectively, such that the user can adjust the setting for the receiving channel manually by human intervention in time in case that an exception occurs in the automatic setting for the receiving channel. As a result, efficiency of the setting for the receiving channel can be improved effectively.

Furthermore, manual setting for the receiving channel comprises the following operations: information on the geographical position where the image signal receiving apparatus is located is input manually; one-to-one correspondence setting between the transmitting channels and the receiving channels is confirmed manually, that is, each of the transmitting channels corresponds to each of the receiving channels and a confirmation for each correspondence is made manually until all of the transmitting channels correspond to all of the receiving channels one to one, and then the setting for the receiving channel process is completed.

Other steps in the method for setting the receiving channel according to the present embodiment are same as those in the method for setting the receiving channel according to the first embodiment, and repeated description is omitted.

In the method for setting the receiving channel provided in the first and second embodiments, the geographical position where the image signal receiving apparatus is located is determined automatically by the positioning module without inputting the geographical position where the image signal receiving apparatus is located manually, such that after the image signal receiving apparatus moves in geographical position, the setting for the receiving channel becomes more convenient, thus removing the troublesome manual setting for the receiving channel and improving efficiency of the setting for the receiving channel.

Third Embodiment

Figure 3:
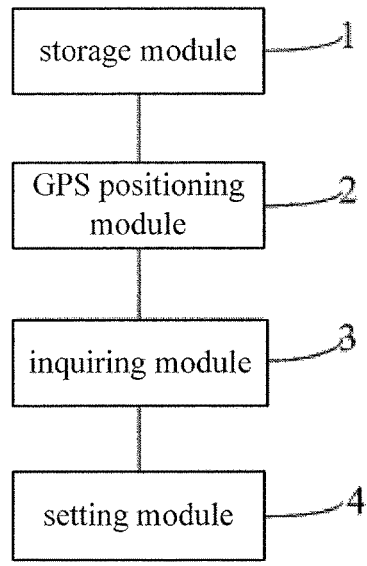
FIG. 3 is a block diagram of structure of an image signal receiving apparatus according to a third embodiment of the present disclosure.

In the present embodiment, on the basis of the method for setting the receiving channel of the image signal receiving apparatus provided in the first embodiment, there is provided an image signal receiving apparatus. As shown in FIG. 3, the image signal receiving apparatus comprises a storage module 1, a positioning module, an inquiring module 3 and a setting module 4. Here, the storage module 1 is configured to store map information which comprises correspondence relationship between transmitting channel and receiving channel at each of different geographical positions. The positioning module is configured to automatically determine a geographical position where the image signal receiving apparatus is located and send the information on the geographical position to the inquiring module 3. The inquiring module 3 is configured to inquire the correspondence relationship between the transmitting channel and the receiving channel of the corresponding geographical position in the storage module according to the information on the geographical position and send result of the inquiry to the setting module 4. The setting module 4 is configured to set the receiving channel of the image signal receiving apparatus according to the result of the inquiry. In the present embodiment, a GPS positioning module 2 is adopted as the positioning module.

Arrangement of the positioning module enables the geographical position where the image signal receiving apparatus is located to be determined automatically without the human intervention, such that after the image signal receiving apparatus moves in geographical position, the setting of the image signal receiving apparatus becomes more convenient and troublesome manual setting may be removed.

It should be noted that the image signal receiving apparatus provided in the present embodiment is a set top box dedicated to receiving the terrestrial digital waves. Of course, the image signal receiving apparatus can also be used to receive the terrestrial radio waves which carry analog signals.

Fourth Embodiment

Figure 4:
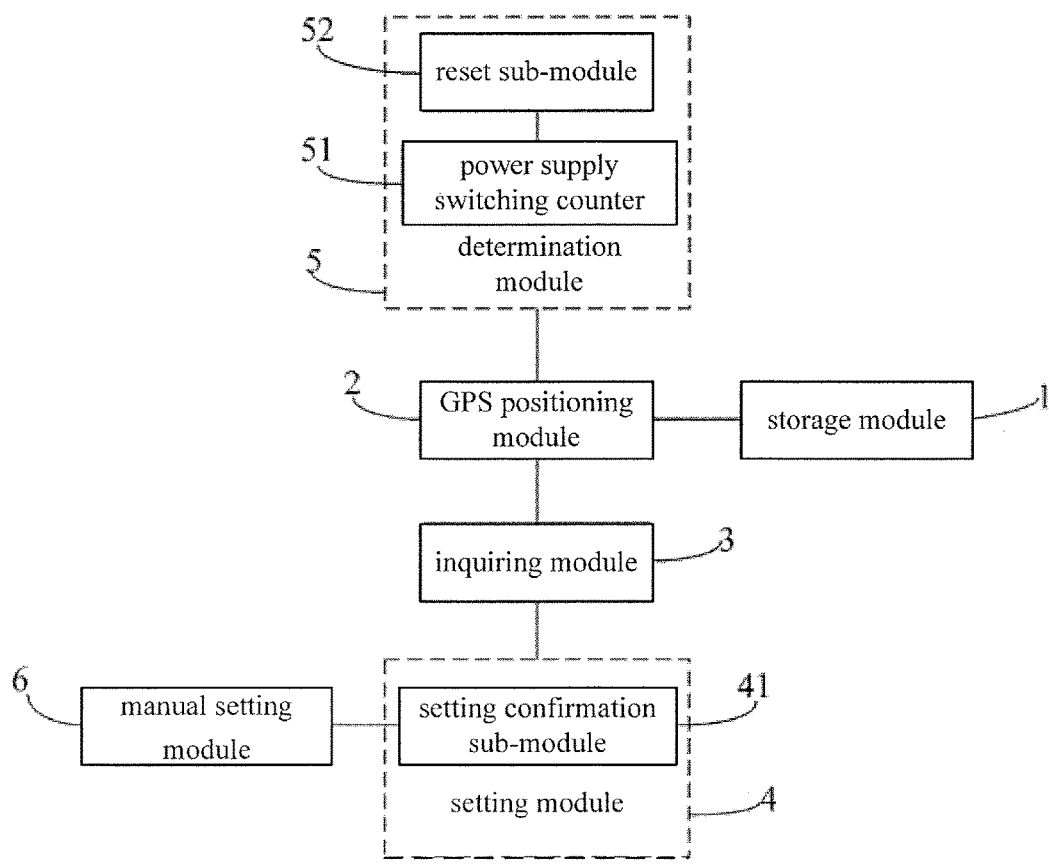
FIG. 4 is a block diagram of structure of an image signal receiving apparatus according to a fourth embodiment of the present disclosure.

In the present embodiment, there is provided an image signal receiving apparatus. As shown in FIG. 4, different from the third embodiment, the image signal receiving apparatus according to the present embodiment further comprises a determination module 5 which is configured to determine whether the image signal receiving apparatus moves in geographical position and send the result of determination to the GPS positioning module 2.

Here, the determination module 5 comprises a power supply switching counter 51 which is configured to determine whether the image signal receiving apparatus moves in geographical position according to a count value. The determination module 5 further comprises a reset sub-module 52 which is configured to reset the count value of the power supply switching counter 51 after the power supply switching counter 51 does not count for a period of time which is equal to or longer than 24 hours.

Arrangement of the determination module 5 makes there is no need for the GPS positioning module 2 to be maintained in an operational state, that is, the GPS positioning module 2 operates only when the image signal receiving apparatus moves in geographical position, so as to determine a new geographical position where the image signal receiving apparatus is currently located. Therefore, efficiency of the setting for the receiving channel of the image signal receiving apparatus can be improved and power consumption can be saved.

In the present embodiment, the setting module 4 further comprises a setting confirmation sub-module 41. The setting confirmation sub-module 41 is configured to prompt the user with the setting confirmation signals after the transmitting channel and the receiving channel of the image signal receiving apparatus are set in one-to-one correspondence; and to send a feedback signal to the setting module 4 according to the reply to the setting confirmation signal. The setting module 4 sets the receiving channel of the image signal receiving apparatus according to the feedback signal. Here, the setting confirmation sub-module 41 feeds "positive" or "negative" back to the setting module 4 according to whether the reply to the setting confirmation signal is positive or negative. If the setting module 4 receives a "positive" feedback signal, the receiving channel of the image signal receiving apparatus is set. If the setting module 4 receives a "negative" feedback signal, the previous one-to-one correspondence setting for the receiving channel will be cancelled completely and meanwhile a manual setting for the receiving channel will be initiated. In addition, the GPS positioning module 2 is further configured to receive the setting confirmation signal and is deactivated.

Arrangement of the setting confirmation sub-module 41 enables the user to know in time and then control effectively the automatic setting for the receiving channel, such that the user can adjust the setting for the receiving channel manually by human intervention in time in case that an exception occurs in the automatic setting for the receiving channel. As a result, efficiency of the setting for the receiving channel can be improved effectively.

Furthermore, in the present embodiment, the image signal receiving apparatus further comprises a manual setting module 6. The manual setting module 6 is configured to receive the reply to the setting confirmation signal, and decide whether to initiate the manual setting for the receiving channel of the image signal receiving apparatus according to the reply to the setting confirmation signal. The manual setting module 6 is further configured to input the information on the geographical position where the image signal receiving apparatus is located manually, and confirm the one-to-one correspondence setting of the transmitting channel and the receiving channel manually.

Arrangement of the manual setting module 6 enables the setting for the receiving channel to be normally performed even if the GPS positioning module 2 malfunctions, which will not retard the viewing of the display program at the new geographical position, thus making the setting for the receiving channel of the image signal receiving apparatus more flexible and convenient while ensuring higher practicability of the image signal receiving apparatus.

It should be explained that the image signal receiving apparatus provided in the present embodiment can be a set top box dedicated to receiving the terrestrial digital waves. Of course, the image signal receiving apparatus can also be used to receive the terrestrial radio waves which carry analog signals.

Other structures in the image signal receiving apparatus according to the present embodiment are same as those in the image signal receiving apparatus according to the third embodiment, and repeated description is omitted.

In the image signal receiving apparatus provided in the third and fourth embodiments, the geographical position where the image signal receiving apparatus is located is determined automatically by the positioning module without inputting the geographical position where the image signal receiving apparatus is located manually, such that after the image signal receiving apparatus moves in geographical position, the setting for the receiving channel becomes more convenient, thus removing the troublesome manual setting for the receiving channel and improving efficiency of the setting for the receiving channel.

Fifth Embodiment

In the present embodiment, there is further provided a display apparatus comprising the image signal receiving apparatus according to any one of the above third and fourth embodiments of the present disclosure. The image signal receiving apparatus may be arranged inside or outside of the display apparatus. The image signal receiving apparatus enables the display apparatus to receive the terrestrial digital waves transmitted in the geographical position where the display apparatus is located.

By adopting the above-described image signal receiving apparatus, it is more convenient for the display apparatus to receive display program at the geographical position where the display apparatus is located.

It should be understood that the above descriptions are only for illustrating the embodiments of the present disclosure, and in no way limit the scope of the present disclosure. It will be obvious that those skilled in the art may make variations or alternatives to the above embodiments without departing from the spirit and scope of the present disclosure as defined by the following claims. Such variations and alternatives are intended to be included within the spirit and scope of the present disclosure.

The present application claims the priority of a Chinese application with an application No. 201410040197.1 and filed on Jan. 27, 2014, the disclosure of which is entirely incorporated herein as a part of the present disclosure by reference.

What is claimed is:

1. A method for setting a receiving channel of an image signal receiving apparatus comprising:
    storing a map information in the image signal receiving apparatus, wherein the map information comprises a correspondence relationship between a transmitting channel and the receiving channel at each of different geographical positions;
    automatically determining, by a GPS positioning module, a geographical position where the image signal receiving apparatus is located;
    inquiring the correspondence relationship between the transmitting channel and the receiving channel according to the geographical position where the image signal receiving apparatus is located; and
    setting the receiving channel of the image signal receiving apparatus according to a result of the inquiry;
    wherein before the geographical position, where the image signal receiving apparatus is located, is determined automatically by the GPS positioning module, it is determined whether the image signal receiving apparatus moves in geographical position according to a count value of a power supply switching counter; and
    the GPS positioning module is activated if the image signal receiving apparatus moves in geographical position, otherwise the GPS positioning module is maintained to be deactivated,
    wherein it is determined that the image signal receiving apparatus moves in geographical position if the count value is 1, and the count value of the power supply switching counter is reset after a time period in which the power supply switching counter does not count exceeds a threshold time period,
    wherein the count value is increased when a power supply plug of the image signal receiving apparatus is plugged in/out.

2. The method of claim 1, wherein it is determined the image signal receiving apparatus does not move in geographical position if the count value is an integer equal to or bigger than 2.

3. The method of claim 2, wherein the threshold time period is equal to 24 hours.

4. The method of claim 1, wherein said setting the receiving channel of the image signal receiving apparatus according to the result of the inquiry comprises: setting the transmitting channel and the receiving channel of the image signal receiving apparatus in one-to-one correspondence at first before the receiving channel of the image signal receiving apparatus is set; prompting a user with a setting confirmation signal after the transmitting channel and the receiving channel of the image signal receiving apparatus are set in one-to-one correspondence; setting the receiving channel of the image signal receiving apparatus and deactivating the GPS positing module if a reply to the setting confirmation signal is positive; otherwise, deactivating the GPS positing module and initiating a manual setting for the receiving channel of the image signal receiving apparatus.

5. An image signal receiving apparatus comprising a storage module, a GPS positioning module, an inquiring module, a setting module and a determination module, wherein the storage module is configured to store map information which comprises a correspondence relationship between a transmitting channel and a receiving channel at each of different geographical positions;

the GPS positioning module is configured to determine a geographical position where the image signal receiving apparatus is located automatically and send an information on the geographical position to the inquiring module;

the inquiring module is configured to inquire the correspondence relationship between the transmitting channel and the receiving channel at the geographical position in the storage module according to the information on the geographical position and send a result of the inquiry to the setting module; and the setting module is configured to set the receiving channel of the image signal receiving apparatus according to the result of the inquiry;

the determination module comprises a power supply switching counter configured to determine whether the image signal receiving apparatus moves in geographical position according to a count value of the power supply switching counter, before determining the geographical position, where the image signal receiving apparatus is located, automatically by the GPS positioning module; and the GPS positioning module is activated if the image signal receiving apparatus moves in geographical position, otherwise the GPS positioning module is maintained to be deactivated, wherein the determination module determines that the image signal receiving apparatus moves in geographical position if the count value is 1;

and the determination module further comprises a reset sub-module configured to reset the count value of the power supply switching counter after a time period in which the power supply switching counter does not count exceeds a threshold time period;

wherein power supply switching counter is configured to increase the count value when a power supply plug of the image signal receiving apparatus is plugged in/out.

6. The image signal receiving apparatus of claim 5, wherein the threshold time period is equal to 24 hours.

7. The image signal receiving apparatus of claim 5, wherein the setting module further comprises a setting confirmation sub-module configured to prompt a user with a setting confirmation signal after the transmitting channel and the receiving channel of the image signal receiving apparatus are set in one-to-one correspondence and to send a feedback signal to the setting module according to a reply to the setting confirmation signal among the setting confirmation signals;

the setting module is configured to set the receiving channel of the image signal receiving apparatus according to the feedback signal;

the GPS positioning module is further configured to receive the setting confirmation signal and to be deactivated.

8. The image signal receiving apparatus of claim 7, further comprising a manual setting module configured to receive the reply to the setting confirmation signal, and to decide whether to initiate a manual setting for the receiving channel of the image signal receiving apparatus according to the reply to the setting confirmation signal.

9. A display apparatus comprising the image signal receiving apparatus of claim 5.

10. The display apparatus of claim 9, wherein the threshold time period is equal 24 hours.

11. The display apparatus of claim 9, wherein the setting module further comprises a setting confirmation sub-module configured to prompt a user with a setting confirmation signal after the transmitting channel and the receiving channel of the image signal receiving apparatus are set in one-to-one correspondence and to send a feedback signal to the setting module according to a reply to the setting confirmation signal among the setting confirmation signals;

the setting module is configured to set the receiving channel of the image signal receiving apparatus according to the feedback signal;

the GPS positioning module is further configured to receive the setting confirmation signal and to be deactivated.

12. The display apparatus of claim 11, further comprising a manual setting module configured to receive the reply to the setting confirmation signal, and to decide whether to initiate a manual setting for the receiving channel of the image signal receiving apparatus according to the reply to the setting confirmation signal.

13. The image signal receiving apparatus of claim 5, wherein it is determined the image signal receiving apparatus does not move in geographical position if the count value is an integer equal to or bigger than 2.

14. The display apparatus of claim 9, wherein it is determined the image signal receiving apparatus does not move in geographical position if the count value is an integer equal to or bigger than 2.

* * * * *